US012613227B2

(12) United States Patent
Bangtsson et al.

(10) Patent No.: US 12,613,227 B2
(45) Date of Patent: Apr. 28, 2026

(54) METHOD IN BIOPROCESS PURIFICATION SYSTEM

(71) Applicant: Cytiva Sweden AB, Uppsala (SE)

(72) Inventors: Petra Bangtsson, Uppsala (SE); Key Hyckenberg, Uppsala (SE); Lars Henning Ivar Mattson, Uppsala (SE); Ulrika Skarp, Uppsala (SE)

(73) Assignee: Cytiva Sweden AB, Uppsala (SE)

( * ) Notice: Subject to any disclaimer, the term of this patent is extended or adjusted under 35 U.S.C. 154(b) by 641 days.

(21) Appl. No.: 16/625,847

(22) PCT Filed: Jul. 3, 2018

(86) PCT No.: PCT/EP2018/067932
§ 371 (c)(1),
(2) Date: Dec. 23, 2019

(87) PCT Pub. No.: WO2019/007948
PCT Pub. Date: Jan. 10, 2019

(65) Prior Publication Data
US 2020/0124578 A1 Apr. 23, 2020

(30) Foreign Application Priority Data
Jul. 4, 2017 (GB) ...................................... 1710691

(51) Int. Cl.
*G01N 30/88* (2006.01)
*B01D 15/10* (2006.01)
(Continued)

(52) U.S. Cl.
CPC ............. *G01N 30/88* (2013.01); *B01D 15/10* (2013.01); *G01N 30/8693* (2013.01);
(Continued)

(58) Field of Classification Search
CPC ............... G01N 30/88; G01N 30/8693; G01N 30/8696; G01N 2030/8804; G01N 2030/8886; B01D 15/10; G05B 13/048
See application file for complete search history.

(56) References Cited

U.S. PATENT DOCUMENTS 4,681,513 A      7/1987  Saito et al.
5,838,563 A  *  11/1998  Dove ................. G05B 19/0426
                                                                                    700/86
(Continued)

FOREIGN PATENT DOCUMENTS

CN          103889533 A      6/2014
EP            2581741 A1      4/2013
(Continued)

OTHER PUBLICATIONS

Stenland, et al., "A Practical and Scalable Manufacturing Process for an Antifungal Agent, Nikkomycin Z," Organic Process Research & Development, ACS, vol. 17, Iss. 2, pp. 265-272, DOI: 10.1021/op3003294. (Year: 2013).*
(Continued)

*Primary Examiner* — Benjamin R Whatley
*Assistant Examiner* — Curtis A Thompson
(74) *Attorney, Agent, or Firm* — Eversheds-Sutherland (US) LLP

(57) ABSTRACT

The present invention relates to a method for reconstructing events related to a process run in a bioprocess purification system comprising hardware configured to control the events related to the purification of a liquid containing a sample in the bioprocess purification system. The method comprising: recording hardware state S11 related to the process run; recording readings from sensors S12 related to the process run; and synchronizing hardware state S13 with readings from sensors to link the hardware state with the result from the process run. The present invention also (Continued)

related to a method for simulating future events related to a process run in a bioprocess purification system comprising hardware configured to control the events related to the purification of a liquid containing a sample in the bioprocess purification system. The events are controlled by a number of instructions executed consecutively and the method comprising: establishing a current state S21 of the process run; assessing an outcome S23 of each non-executed instructions based on information stored in a data storage medium; and predicting future events S24 based on the current state of the process run and the assessed outcome of the non-executed instructions.

15 Claims, 16 Drawing Sheets

(51) Int. Cl.
  G01N 30/86 (2006.01)
  G05B 13/04 (2006.01)
(52) U.S. Cl.
  CPC ....... G01N 30/8696 (2013.01); G05B 13/048 (2013.01); G01N 2030/8804 (2013.01); G01N 2030/8886 (2013.01)

(56) References Cited

U.S. PATENT DOCUMENTS

| | | | |
|---|---|---|---|
| 5,852,231 A | 12/1998 | Kaji | |
| 8,295,951 B2 | 10/2012 | Crisalle et al. | |
| 2002/0013629 A1* | 1/2002 | Nixon | G05B 19/0421 |
| | | | 700/3 |
| 2002/0112530 A1 | 8/2002 | Kitagawa | |
| 2005/0106741 A1* | 5/2005 | Dijke | G01N 33/03 |
| | | | 436/140 |
| 2005/0228523 A1* | 10/2005 | Heminway | G05B 19/41865 |
| | | | 700/99 |
| 2007/0062876 A1* | 3/2007 | Srinivasan | G01N 30/96 |
| | | | 210/660 |
| 2008/0109090 A1* | 5/2008 | Esmaili | G05B 17/02 |
| | | | 700/29 |
| 2008/0131882 A1* | 6/2008 | Rasmussen | G01N 33/6803 |
| | | | 435/7.1 |
| 2011/0218820 A1* | 9/2011 | Himes | G16H 20/70 |
| | | | 705/3 |
| 2012/0007868 A1* | 1/2012 | Buck | G06Q 30/06 |
| | | | 345/440.1 |
| 2012/0118144 A1 | 5/2012 | Cates | |
| 2013/0028828 A1 | 1/2013 | Lujano et al. | |
| 2015/0026659 A1 | 1/2015 | Ding | |

| | | | |
|---|---|---|---|
| 2015/0109307 A1* | 4/2015 | Baartz | A61B 5/339 |
| | | | 345/440.1 |
| 2015/0233873 A1 | 8/2015 | Yanagisawa | |
| 2016/0118235 A1* | 4/2016 | Fujita | H01J 49/022 |
| | | | 250/290 |

FOREIGN PATENT DOCUMENTS

| | | | |
|---|---|---|---|
| EP | 2642285 A1 | 9/2013 |
| GB | 892305 | 3/1962 |
| JP | 2007-3241 A | 1/2007 |
| WO | 2013/028828 A1 | 2/2013 |
| WO | 2016/173928 A1 | 11/2016 |
| WO | 2016/200756 A1 | 12/2016 |
| WO | 2017/066630 A1 | 4/2017 |

OTHER PUBLICATIONS

Toumi, Abdelaziz, et al. "Design and optimization of a large scale biopharmaceutical facility using process simulation and scheduling tools." Pharmaceutical Engineering 30.2 (2010): 1-9. (Year: 2010).*
Carr, Nicholas B. Development of a tailored methodology and forensic toolkit for industrial control systems incident response. Diss. Monterey, California: Naval Postgraduate School, 2014. Accessed Online: <https://apps.dtic.mil/sti/citations/ADA606880>(Year: 2014).*
Metrohm AG, MagIC Net Tutorial, 8.103.8001EN (Year: 2009).*
Metrohm AG, MagIC Net 2.0 Online Help; 8.102.8004EN (Year: 2007).*
Metrohm Marketing Support IC, Biochemistry, Biology Application Notes (AN) (Year: 2005).*
Metrohm AG, 850 Professional IC Manual, 8.850.8015EN (Year: 2009).*
The 4S Company, GC-SOS Gas Chromatography Simulation & Optimization Software, Feb. 10, 2017, Current version 6.00, p. 22 (Year: 2017).*
Bio-Rad, NGC Chromatography Systems and ChromLab Software User Guide, 2015, Version 3.3, pp. 25 & 130 (Year: 2015).*
PCT International Search Report and Written Opinion for PCT Application No. PCT/EP2018/067932 mailed Mar. 26, 2019 (18 pages).
Great Britain Search Report for GB Application No. 1710691.5 mailed Jan. 3, 2018 (4 pages).
Stenland et al., "A Practical and Scalable Manufacturing Process for an Anti-Fungal Agent, Nikkomycin Z," Org Process Rees Dev., 2013, 17(2):265-272.
Chinese Office Action for CN Application No. 201880045285.7, mailed Mar. 28, 2022 (13 pages).
Japanese Office Action for JP Application No. 2019-572131, mailed Mar. 14, 2022 (7 pages).
EP Office Action 18 738 268.4-1020, mailed Sep. 30, 2021 (57 pages).
Second Office Action issued in China application No. 201880045285.7, issued Jul. 7, 2023 (23 pages).

\* cited by examiner

METHOD IN BIOPROCESS PURIFICATION SYSTEM

CROSS REFERENCE TO RELATED

This application claims the priority benefit of PCT/EP2018/067932 filed on Jul. 3, 2018, which claims priority benefit of Great Britain Patent Application No. 1710691.5 filed on Jul. 4, 2017, the entire contents of which are hereby incorporated by reference herein.

TECHNICAL FIELD

The present invention relates to a method for reconstructing events during a process run in a bioprocess purification system, e.g. when feeding the system with a liquid containing a sample. The present invention also relates to a method for simulating future events related to a process run in a bioprocess purification system.

BACKGROUND

Within the field of liquid chromatography, a mixture containing a plurality of substances is generally separated by a column, and a fluid output or eluate from the column is subjected to analysis and subsequently fractioned in a plurality of receiving vessels in a fraction collector. A computer serves as a processing unit and as a user interface and allows the user to adapt and control the process, and the computer also serves to present data and results to the user in the form of a chromatogram with peaks corresponding to different substances in the mixture. The computer display may also present a process picture with symbols for the various parts of the chromatography instrument and allow the user to control the process to some degree by interacting with the process picture, for instance by clicking on a component to alter its operation.

The collected data is also stored and can be reviewed and further analyzed after the process is finalized. However, at this point the process picture is no longer available, so the user has limited connection between the chromatography instrument and the generated data.

Thus, there is a need to improve the possibility for a user to link the result presented in the chromatogram with the chromatography instrument both when analyzing performed process runs and predicting future results before performing a process run.

SUMMARY

An object of the present disclosure is to provide methods and devices configured to execute methods and computer programs which seek to mitigate, alleviate, or eliminate one or more of the above-identified deficiencies in the art and disadvantages singly or in any combination.

The object is achieved by a method for reconstructing events related to a process run in a bioprocess purification system according to claim 1.

An advantage with the method for reconstructing events is that it is possible to retrace events in the process run to identify mistakes made when programming the process run. It is also possible to identify the cause to unexpected events during a process run, wherein the cause could be related to hardware, chemical issues, etc.

The object is also achieved by a method for simulating events related to a process run in a bioprocess purification system according to claim 10.

An advantage with the method for simulating events is that it is possible to reduce the risk for failure during the process run since mistakes in the programming may be identified before executing the program and starting the process run, which creates a more efficient procedure.

Further objects and advantages may be obtained from the detailed description by a skilled person in the art.

DETAILED DESCRIPTION

A chromatogram is normally created when a liquid containing a sample is processed in a bioprocess purification system, and the readings from sensors are included in the chromatogram as a function of method time, i.e. during the process run. Events taking place in non-method time, e.g. events during washes, calibration and when resetting the system, are not included in the chromatogram.

Figure 1:
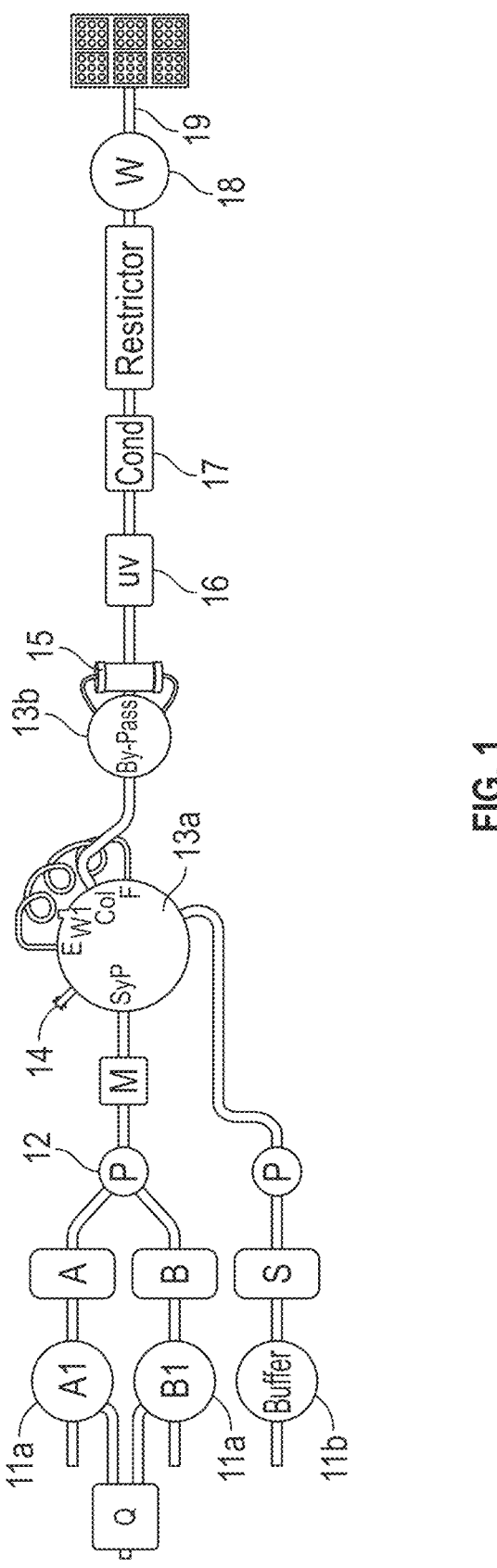
FIG. 1 illustrates an example embodiment of a chromatography instrument used in relation to a bioprocess purification procedure

FIG. 1 illustrates an example embodiment of a chromatography instrument 10 used in relation to a bioprocess purification procedure. It should be mentioned that many different types of chromatography instruments may be used to perform a purification process of sample. The chromatography instrument 10 comprises a number of vessels 11a and 11b containing liquids for the process. In this example feed is provided using two vessels 11a, wherein a first vessel contains liquid "A1" and a second vessel contains liquid "B1". Sample is provided via a third vessel 11b.

The instrument comprises several pumps 12 and valves 13a, 13b, which are used to control the flow of liquids through the instrument. A manual feed 14 may also be provided. The separation is performed using a column 15, which may be by-passed dependent on the position of the valve 13b. Certain parameters are measured during the process run, which in this example is illustrated by a UV sensor 16 and a conductivity sensor 17.

A waste valve 18 is provided to separate waste material from the end product, which is provided at the output 19 and collected in suitable fractions.

All these parts (i.e. feed, buffers, pumps, column, sensors, output) constitute a flow path which is illustrated in the bottom part of FIGS. 2-11.

If a user experience some kind of problem with a run it is impossible to, after the run is completed, reconstruct the hardware state at a given time related to the run. In order to provide the user with an opportunity to reconstruct the hardware state related to the process run, i.e. during method and non-method time, additional information about the system has to be measured and stored for later access. This additional information is thereafter used to display the system state side-by-side with the display of the chromatogram information (ordinary result information). In this display it is possible to wind and rewind the run and also jump to a specific moment to obtain information regarding the state of the hardware even during non-method time, as exemplified in FIGS. 2-11.

In addition to allowing the user to perform forensic analysis of a process run, the same approach may be used to simulate future events related to a process run when executing manual instructions or instructions implemented in a program. This is achieved by based on the knowledge of the current process state of the process run, which determines boundary conditions for the process run. The outcome of each non-executed instruction is assessed based on stored information and future events is predicted based on the current state and the assessed outcome of the non-executed instructions. This will be described in more detail in connection with the flowchart in FIG. 13.

Figure 14:
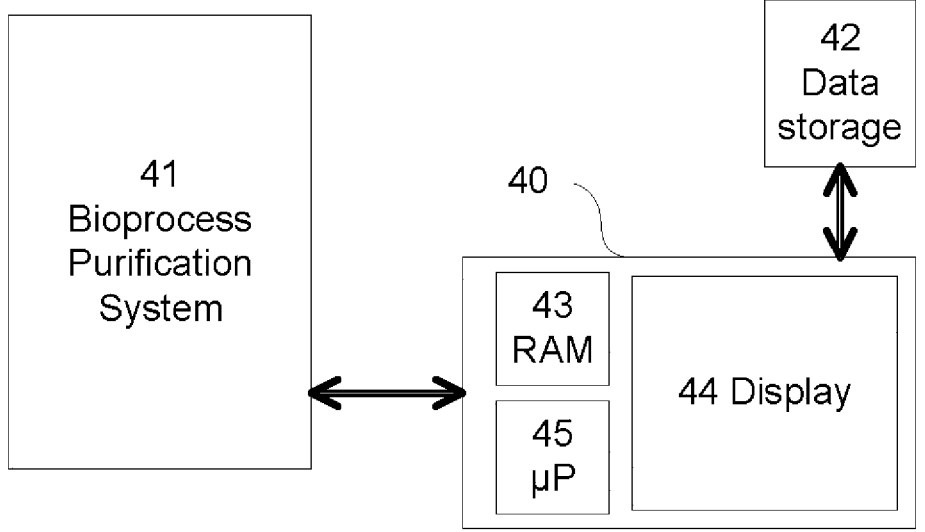
FIG. 14 illustrates a control system configured to interact with a bioprocess purification system.

FIGS. 2-11 illustrate process steps during a process run which may be displayed to a user on a control system, such as described in FIG. 14.

FIGS. 2-11 illustrate a completed chromatogram 20 and a hardware setup 21, which is a digital representation of an actual instrument used to create the chromatogram 20. Each FIG. 2-11 illustrate a specific duration time for a process run and the events related to the process run, as indicated by a time cursor 22, which indicates that the elapsed time in each figure and the duration of the recording is 3.99 min. A control bar 23 contains black sections 24 and gray sections 25. The black sections 24 represents the method time during which sensor values are recorded and presented in the chromatogram 20. The gray sections 25 represents the non-method time, e.g. pump wash before the process run starts (not shown), resting periods to optimize the utilization of the chromatography column, resetting the instrument after completed process run, etc.

Figure 2:
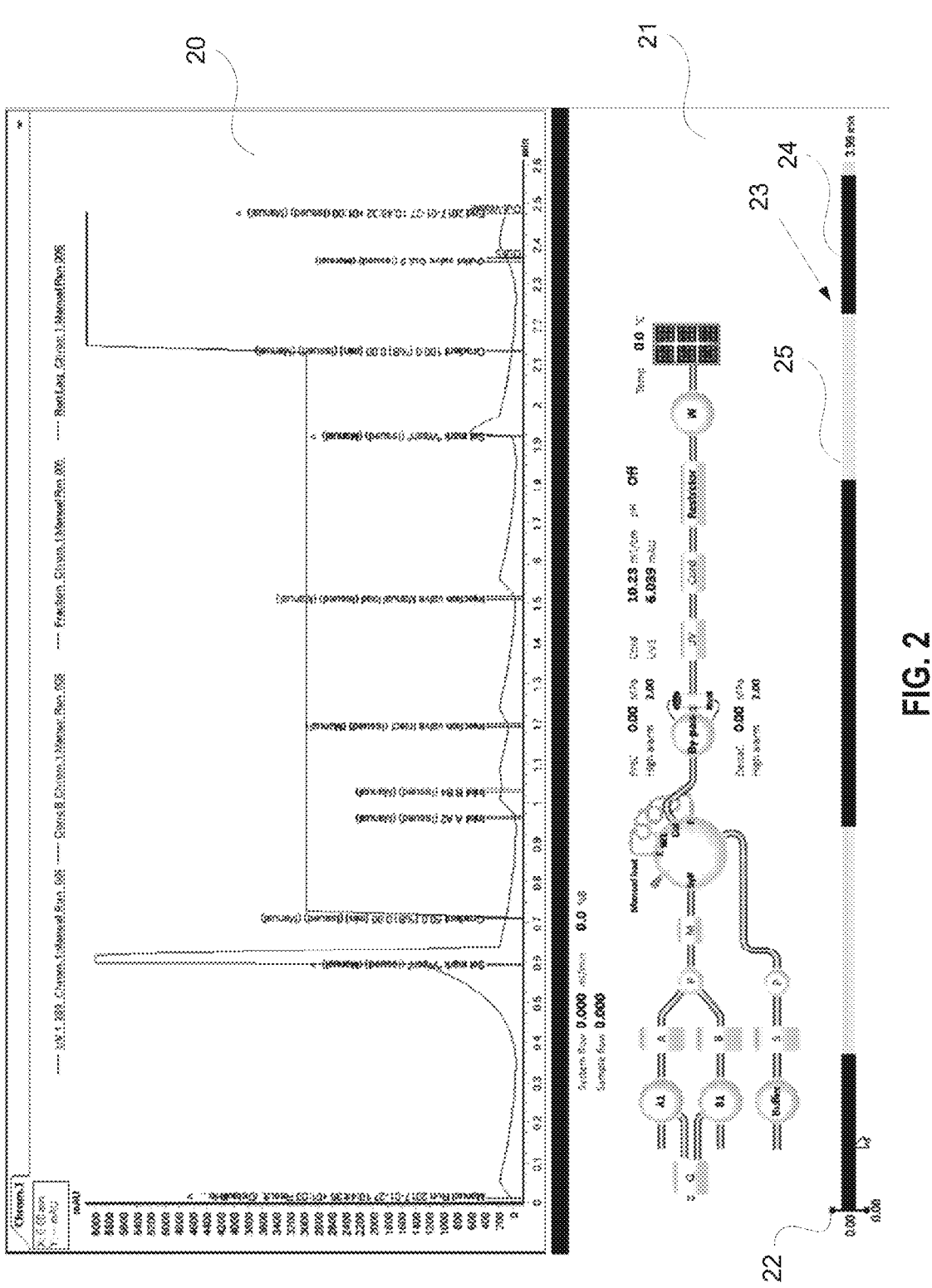
FIGS. 2-11 illustrate process steps during a process run

In FIG. 2, the elapsed time is 0.00 min and the hardware state is in its initializing state.

Figure 3:
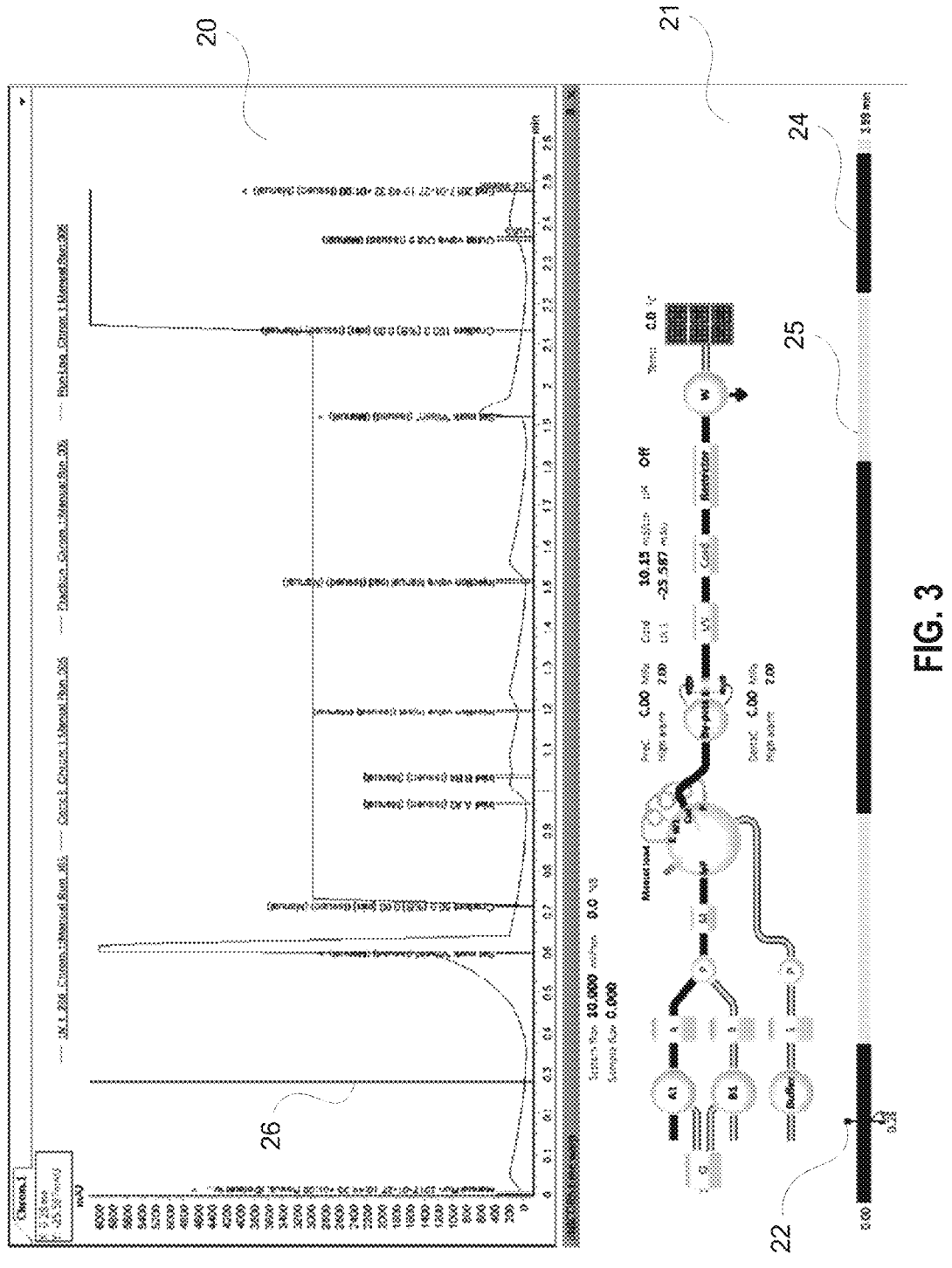

In FIG. 3, the elapsed time is 0.29 min and the hardware is configured to allow a flow of liquid from "A1" through the instrument. The chromatogram is synchronized with the hardware state and a line 26 marks the position in the chromatogram.

Figure 4:
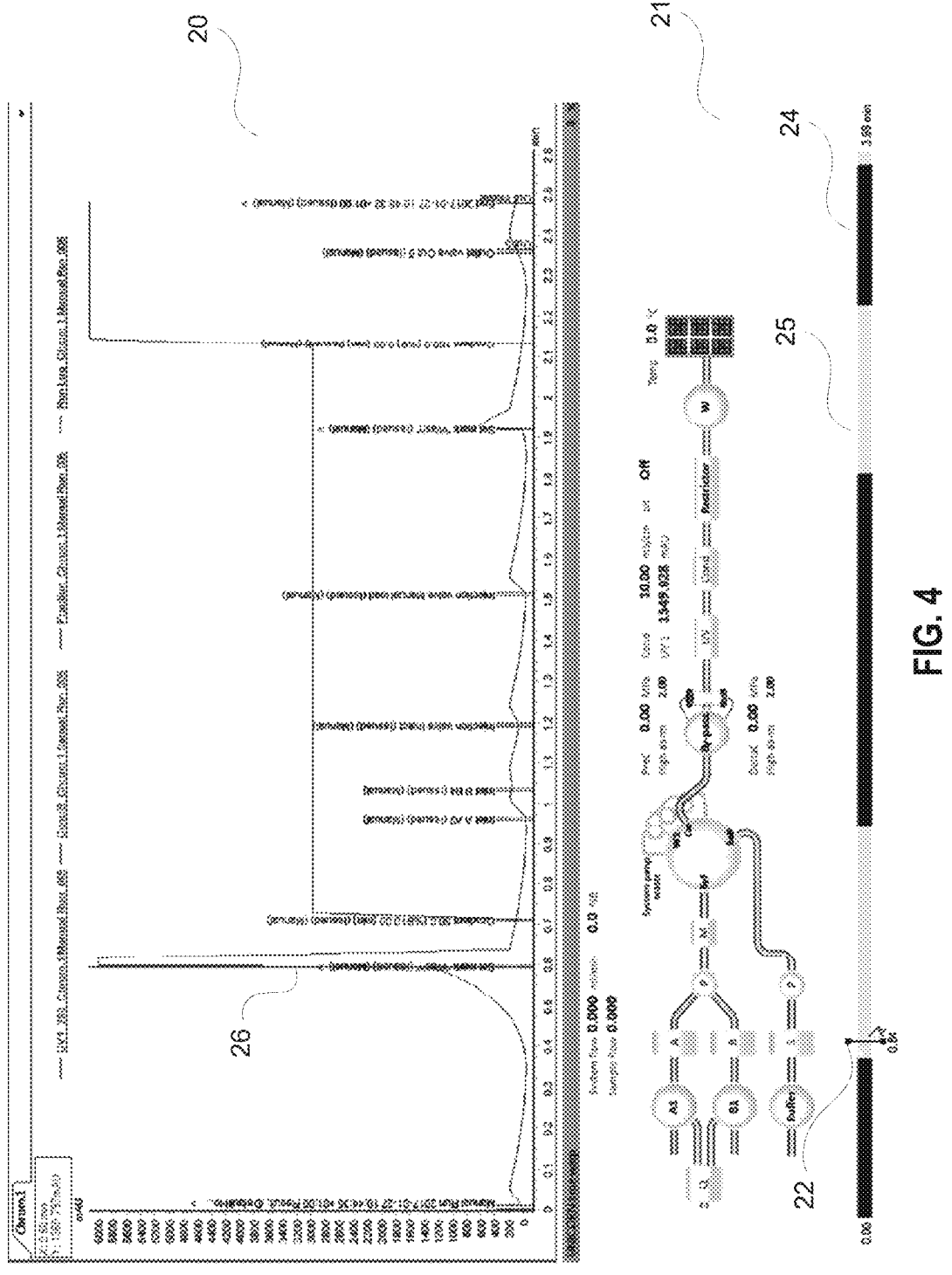

After elapsed time is 0.64 min, as illustrated in FIG. 4, the process run is in the non-method time (as indicated by the gray section 25) and no sensor values are measured to be included in the chromatogram. However, the UV sensor and Conductivity sensor are still measuring values that are available when reconstructing events.

Figure 5:
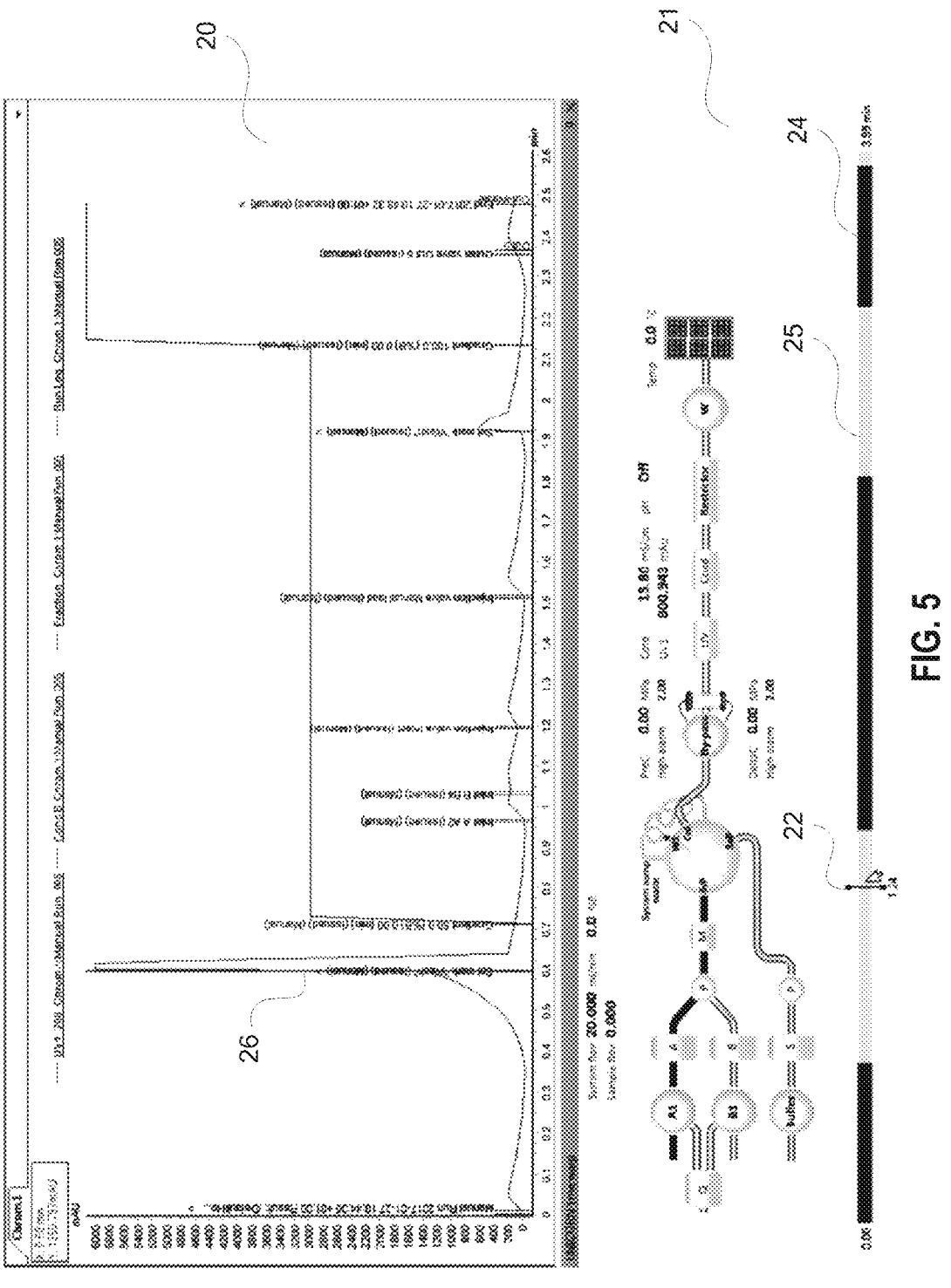

The process run is still in non-method time after 1.24 min, as illustrated in FIG. 5, and the line 26 is still in the same position as in FIG. 4. However, the hardware state is different since some valves have opened to allow liquid from "A1" to flow through a part of the instrument.

Figure 6:
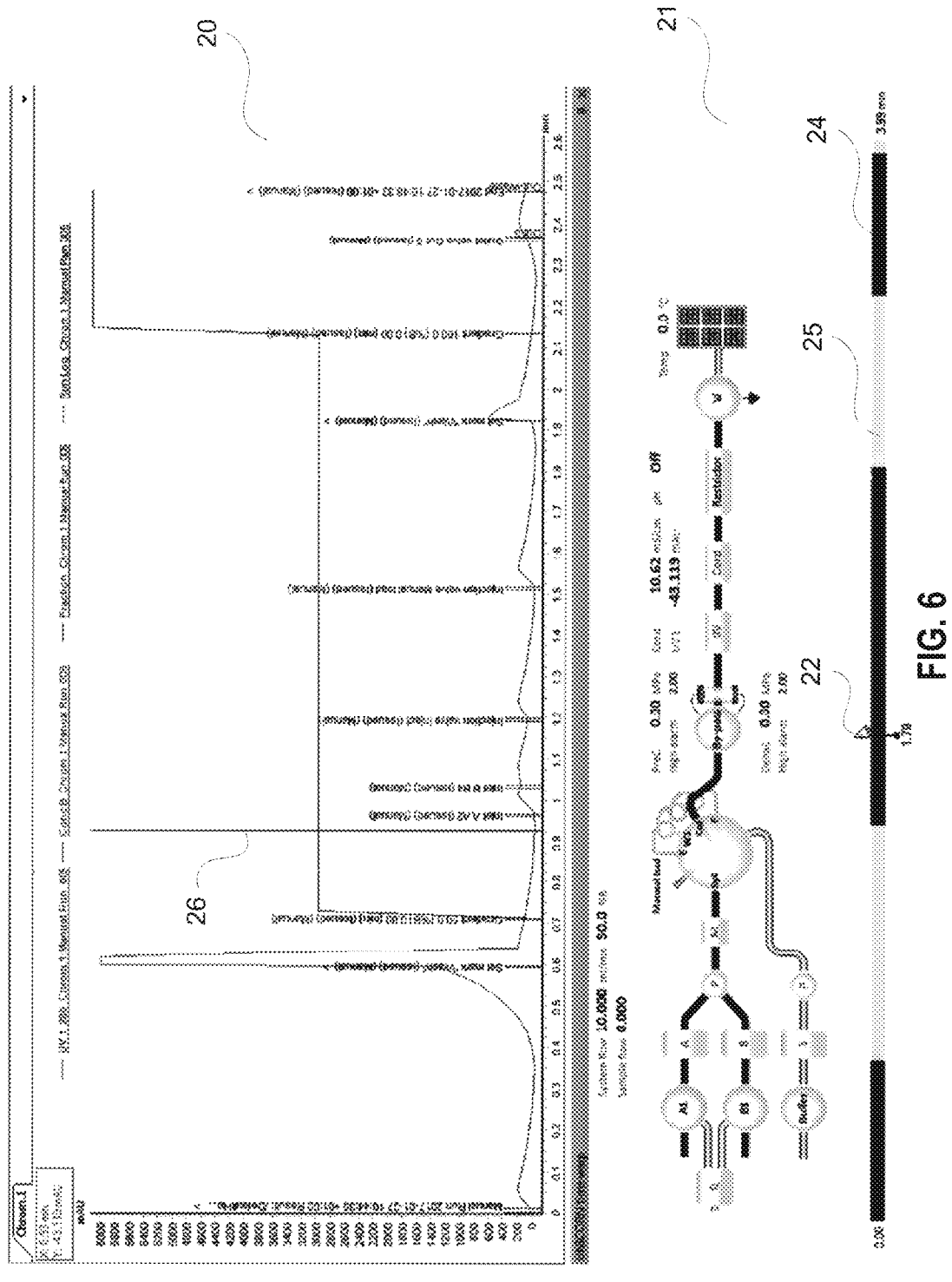

As soon as the process run enters into method time, i.e. the cursor 22 is moved along the control bar 23 into a black section 24, as illustrated in FIG. 6 with elapsed time moved to 1.79 min. The movement cause the line 26 to move along the chromatogram and the hardware state is synchronized with that change. Both liquids from "A1" and "B1" are introduced into the bioprocess system.

Figure 7:
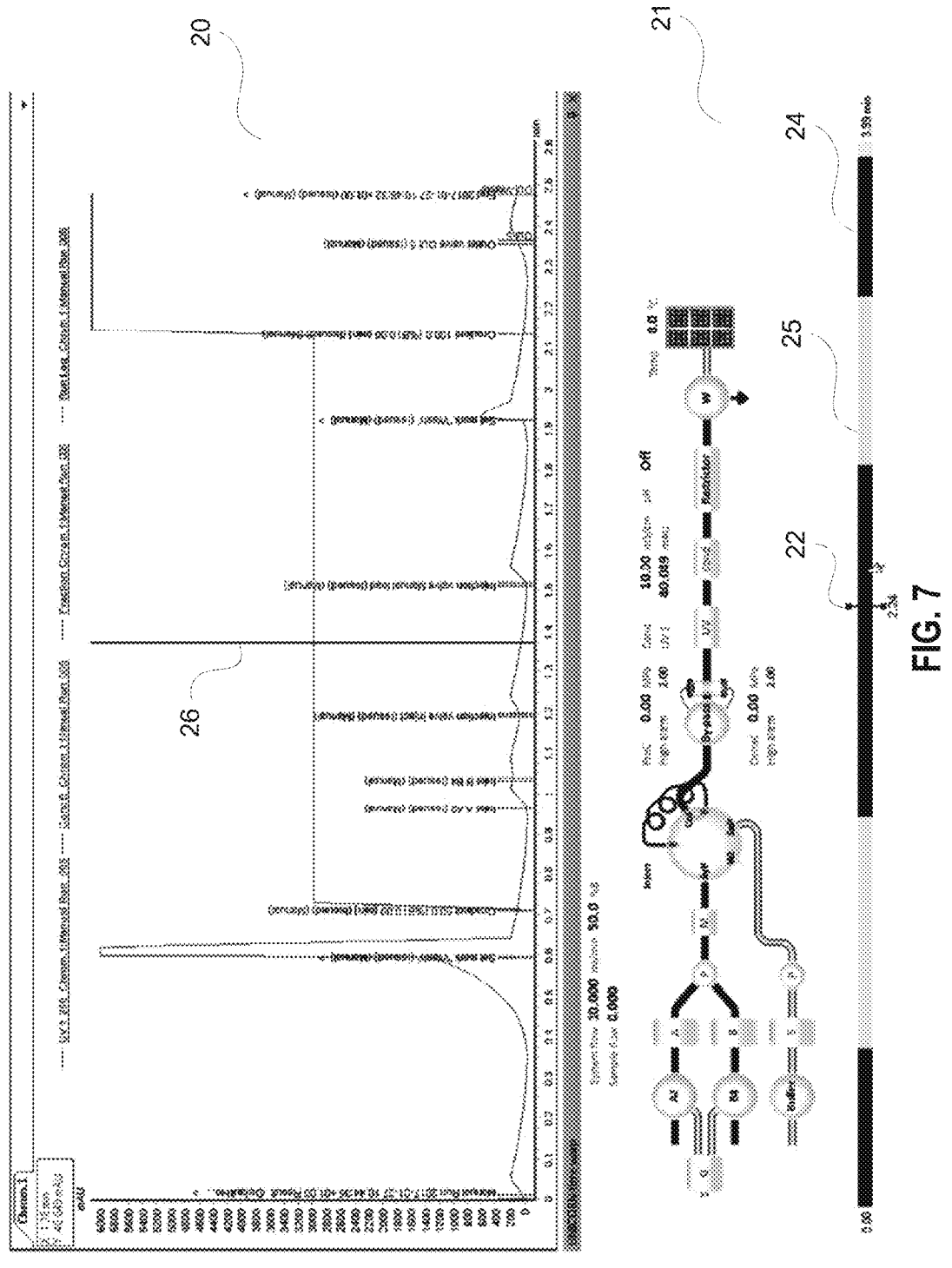
Figure 8:
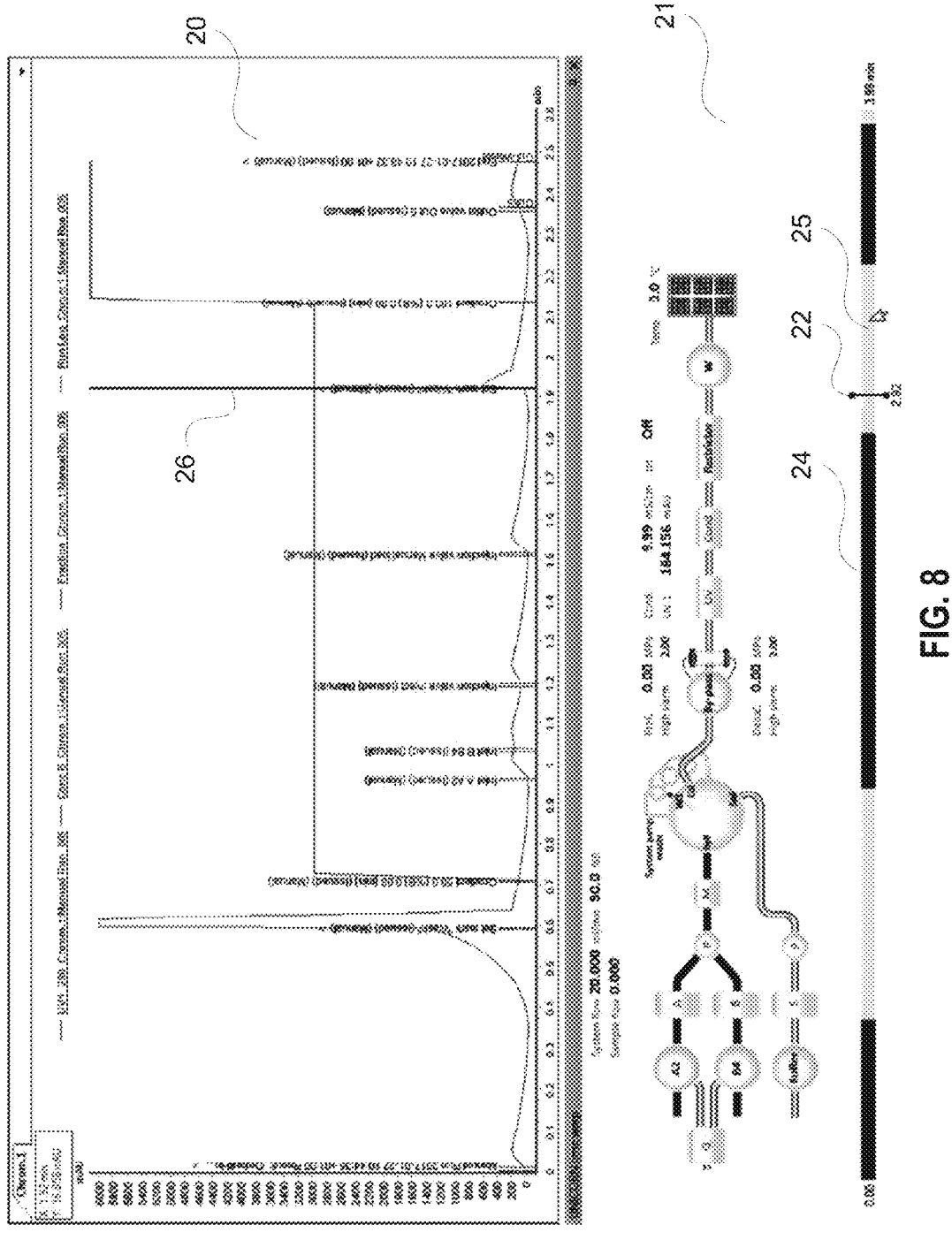

The hardware state may change during the same black section 24, as illustrated in FIG. 7 wherein the elapsed time is 2.24 min. As a response, since the chromatogram and the hardware state are synchronized, the line 26 is moved. When the process is moved to another non-method time, the line 26 remains at the same position as long as the cursor 22 is in the gray section 25. This is illustrated in FIG. 8, where the elapsed time is 2.92 min.

Figure 9:
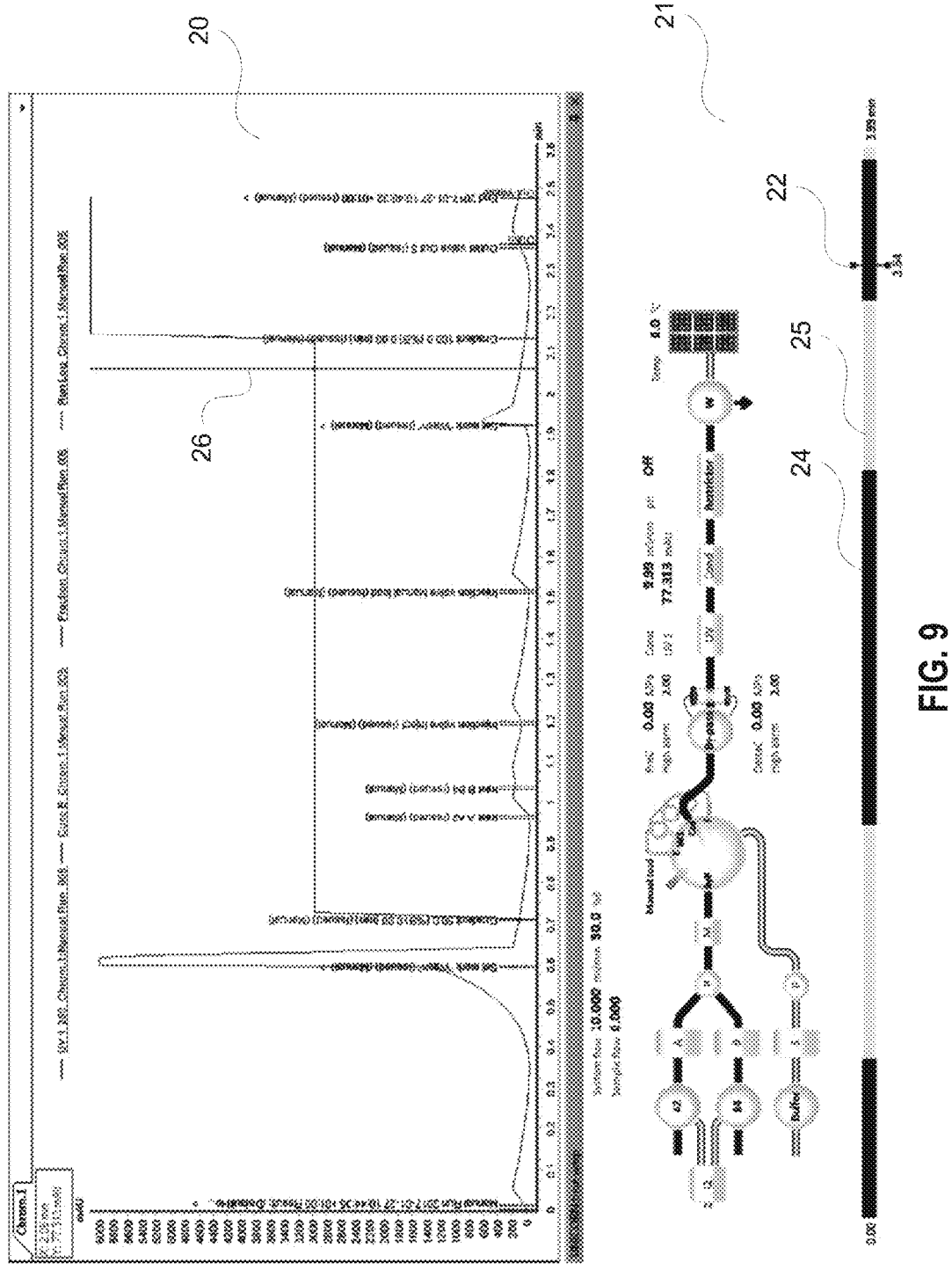
Figure 10:
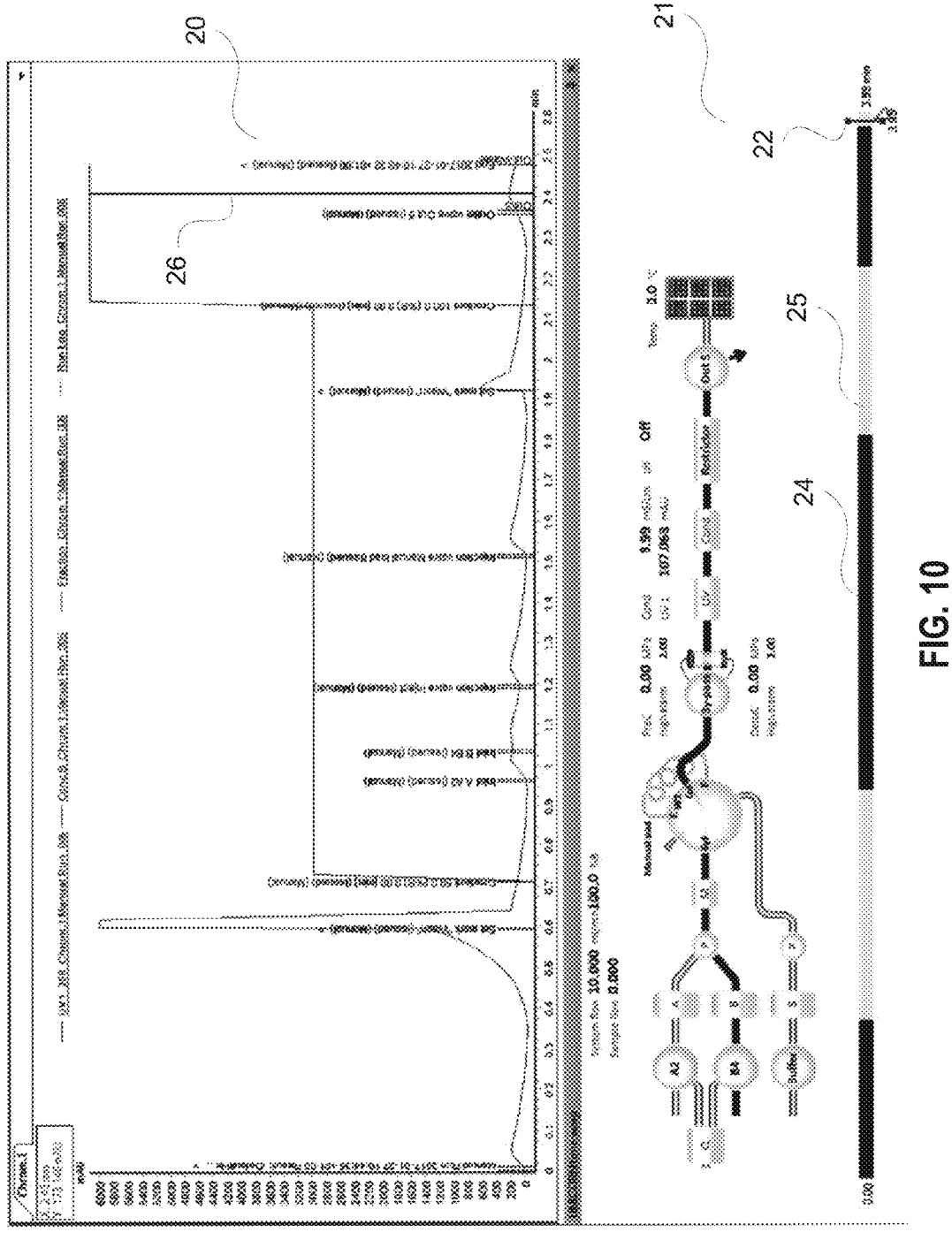

FIG. 9 illustrates the situation when the process has entered method time again after 3.54 min (elapsed time), and FIG. 10 after elapsed time 3.95 min, with the situation when the measurements for the chromatogram is complete, but some minor actions are needed to reset the instrument.

Figure 11:
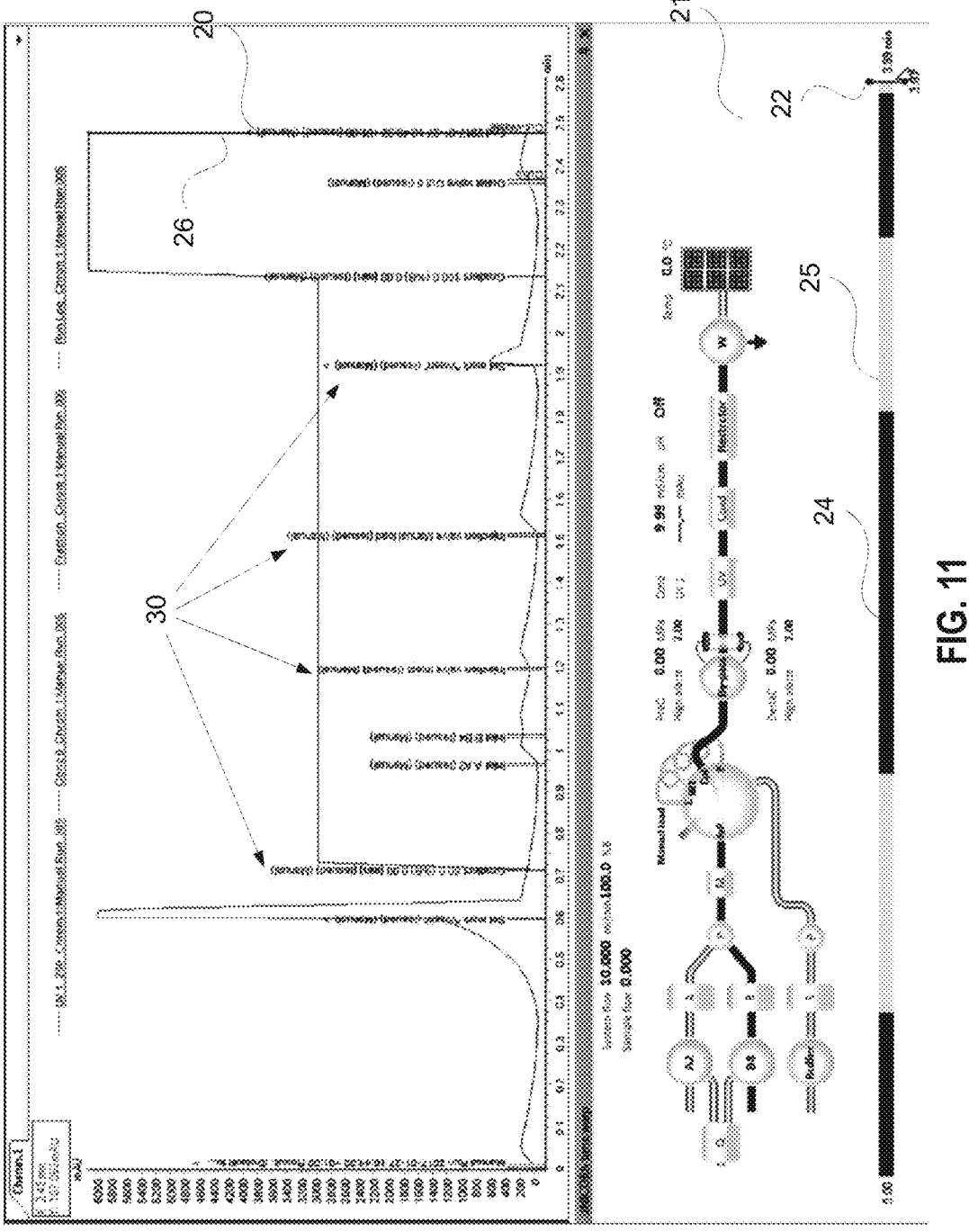

FIG. 11 represents the situation near to the end of the completed process run (after elapsed time 3.97 min). The line 26 in the chromatogram remains at the same position since the process between FIGS. 10 and 11 (until the end of the total process run) is performed in non-method time.

On top of this useful information, it is possible to include information regarding the instructions consecutively executed. In this example, the manual instructions are visible from the chromatogram (se reference numeral 30. in FIG. 11).

Figure 12:
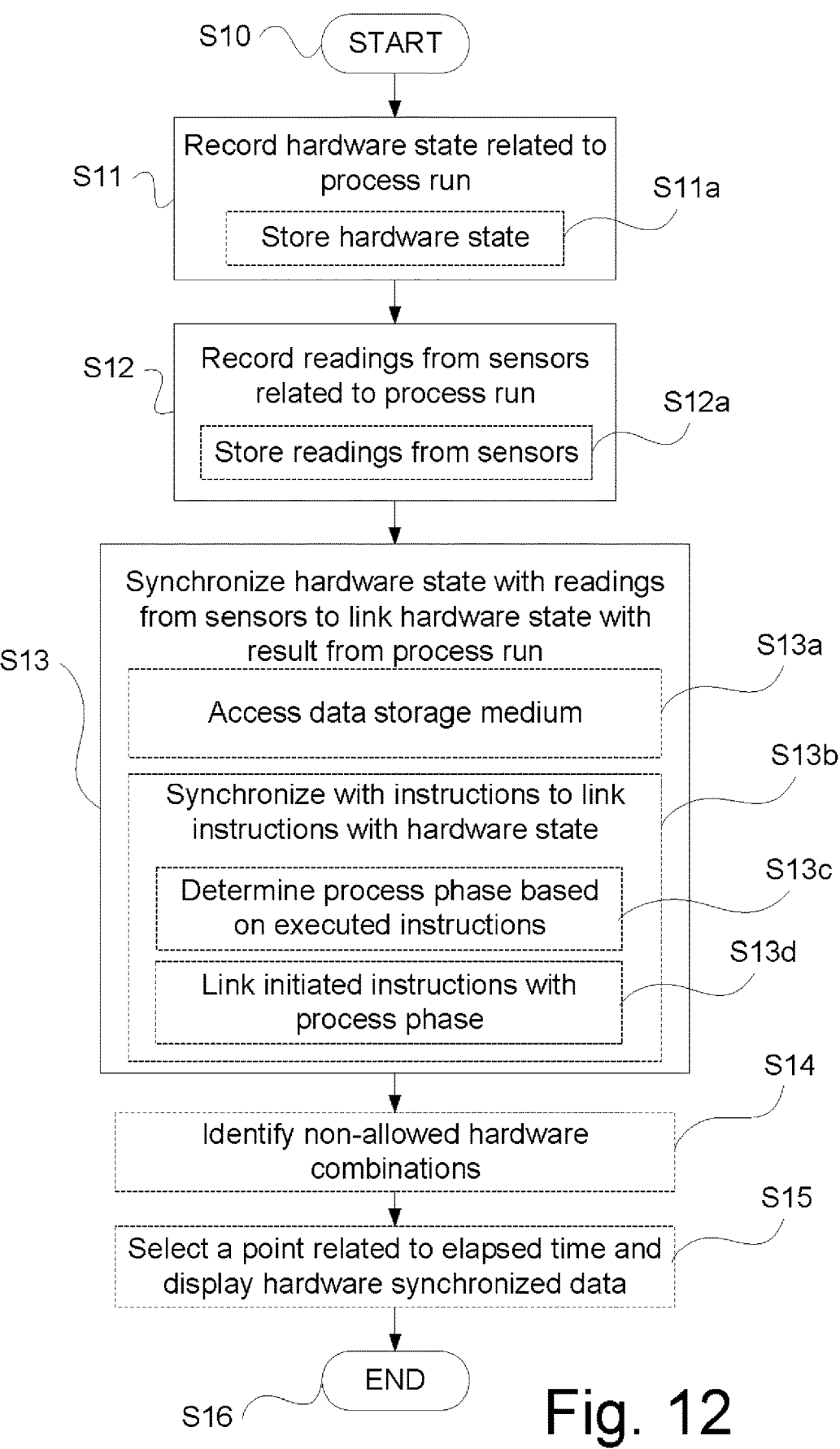
FIG. 12 is a flowchart illustrating a process to reconstruct events in a bioprocess purification system.
Figure 13:
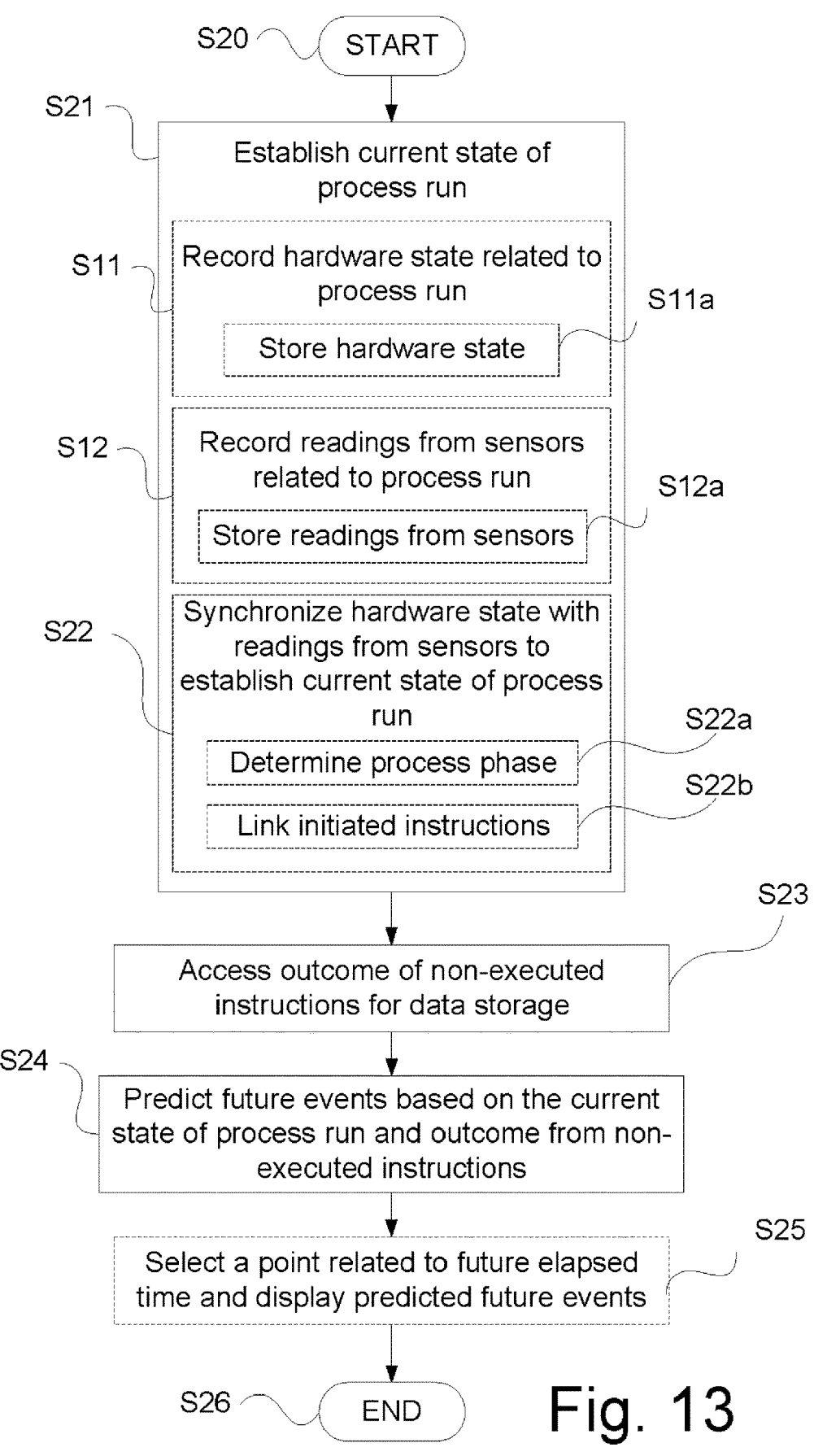
FIG. 13 is a flowchart illustrating a process to simulate future events in a bioprocess purification system.

The graphical user interface, GUI, illustrated in connection with FIGS. 2-11 has the advantage that a user may move the cursor 22 to any position along the control bar 23 to access the hardware state, which is synchronized with the chromatogram, at any given elapsed time. This provides the user with a scrollable GUI as a function of elapsed time related to a process run. The GUI may be used both when reconstructing events related to previously performed bioprocess purification as illustrated in FIG. 12, or when simulating future events in bioprocess purification based on estimated outcomes from executing instructions as illustrated in FIG. 13.

Figure 15:
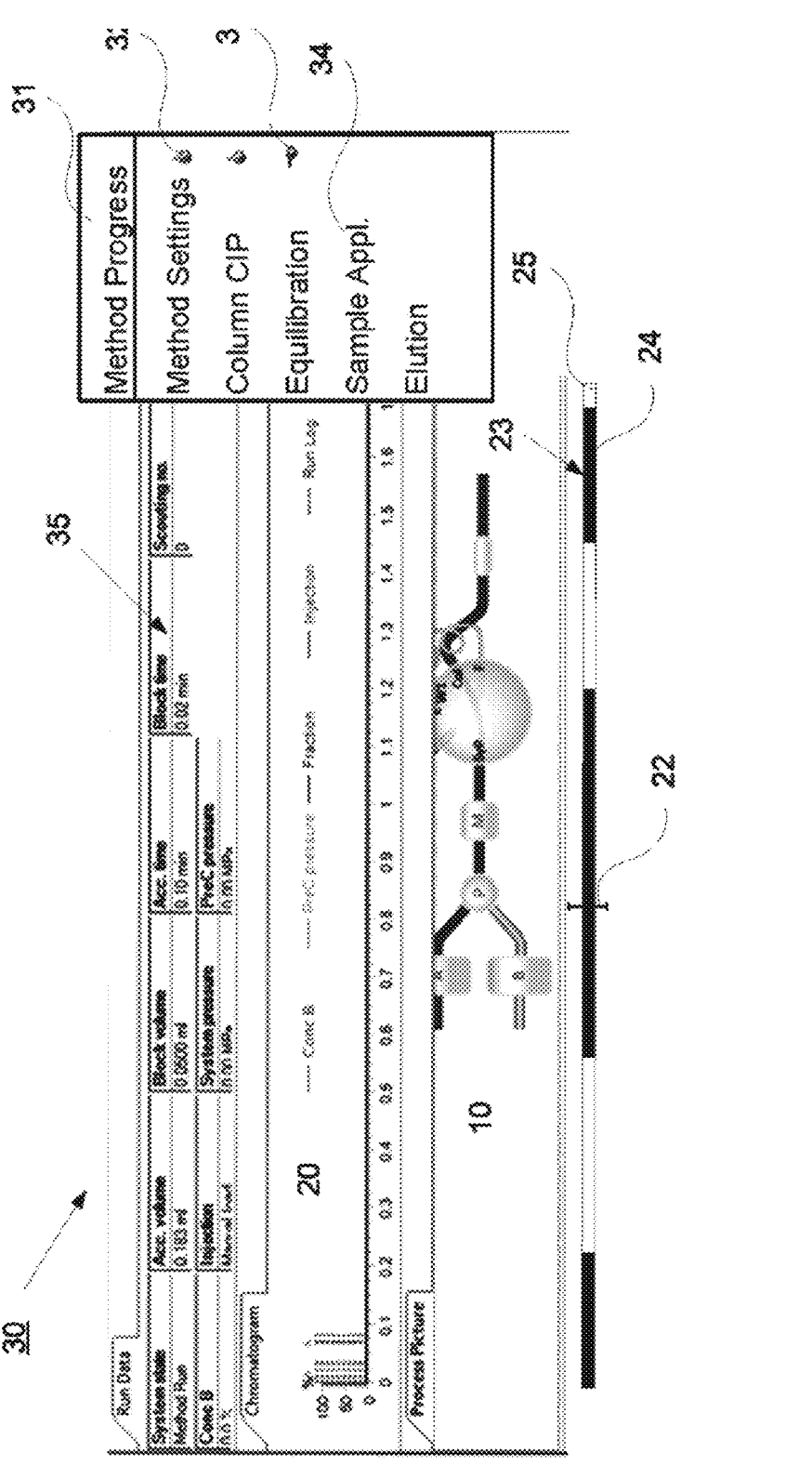
FIG. 15 illustrates the link between hardware state and sensor readings during a process run with process phase information.

FIG. 15 illustrates a graphical User Interface, GUI, 30 in which the link between hardware state 10 and sensor readings, in the form of a chromatogram 20, is presented during a process run with process phase information 31. A control bar 23 is illustrated in the lower part of FIG. 15, having black sections 24 representing method time during which sensor values are recorded and presented in a chromatogram 20 (in this example without sensor readings) and gray sections 25 representing the non-method time as explained above. A cursor 22 is movable along the control bar 23. The added feature in this example embodiment is the right hand panel 31 containing process phase information, showing progression through pre-programmed method phases while performing a chromatography run.

In contrast with the illustrations in FIGS. 2-11, the additional information in the process phase panel 31 makes it possible for a user to obtain information regarding which process steps that have been performed, as indicated by 32, where in a pre-programmed method the process currently is, as indicated by 33, and also showing future steps, as indicated by 34. A separate panel having Run Data 35 may be provided to monitor the process.

Figure 16:
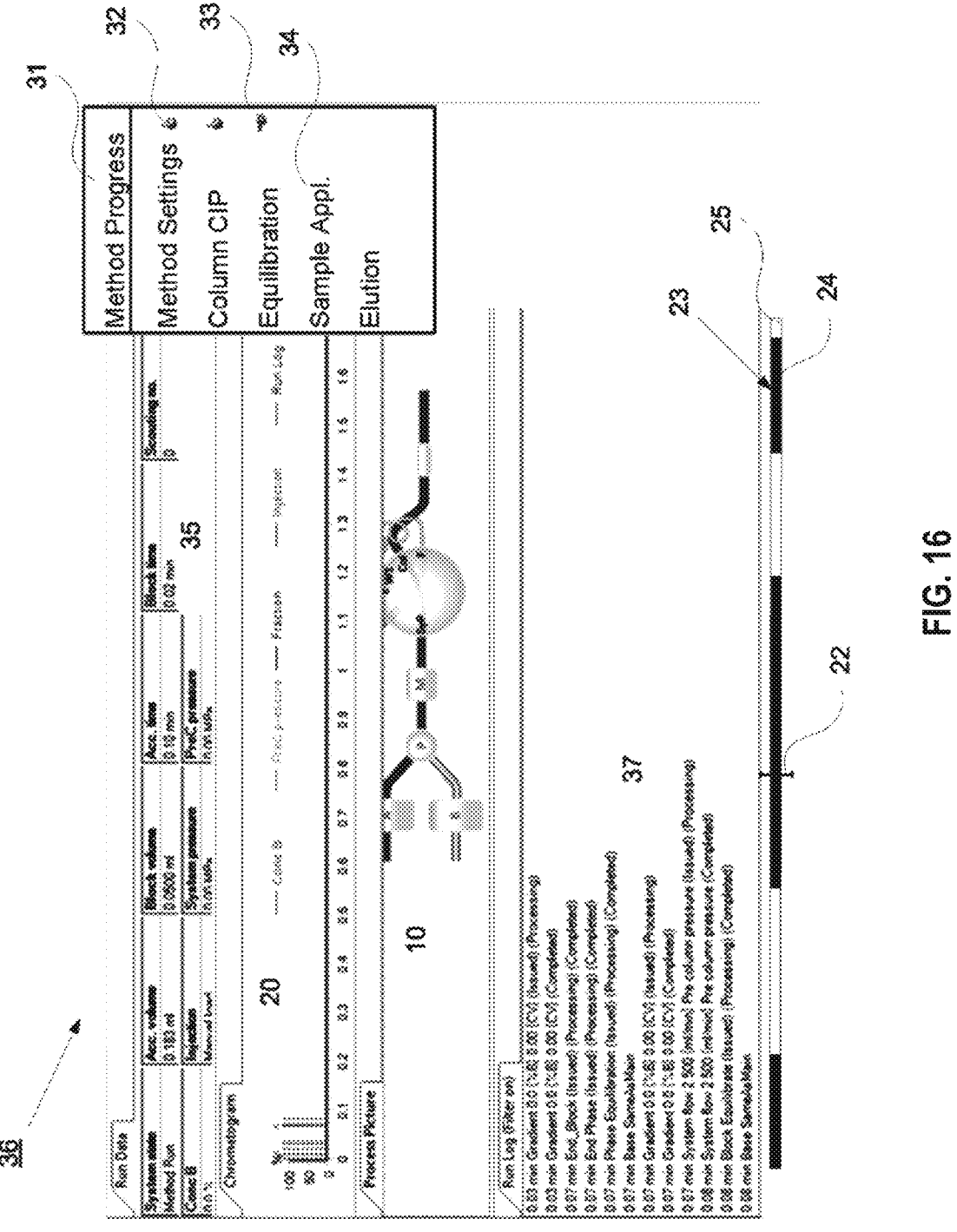
FIG. 16. illustrates the link between hardware state and sensor readings during a process run as illustrated in FIG. 15 with the addition of information regarding executed process steps.

FIG. 16 illustrates a graphical user interface, GUI, 36 similar to the GUI described in connection with FIG. 15 with the addition of information regarding executed instructions related to the pre-programmed method used to perform the process run, and each instruction is associated with a process phase. The executed instructions are presented in a separate panel 37.

By illustrating the process phases (completed 32, active 33 and future 34) in the GUI 30; 36 it is easier for the user to understand the progression through the process run. The length of each phase is estimated which makes it possible to scroll along the control bar and predict future events based on the current state as described in more detail in connection with FIG. 13.

FIG. 12 is a flowchart illustrating a process to reconstruct events related to a bioprocess purification system comprising hardware configured to control the events related to the purification of a liquid containing a sample in the bioprocess purification system. The wording "related to" means that not only events during method time is included, but also other events related to the process run, e.g. actions performed during the process run when the chromatogram is not recording the sensor values, washing performed after the process run is completed etc., are included.

The method starts in step S10 and comprises three main steps:

recording hardware state S11 related to the process run;

recording readings from sensors S12 related to the process run; and synchronizing hardware state S13 with readings from sensors to link the hardware state with the result from the process run.

In the step of recording hardware state S11, e.g. valve positions in the bioprocess purification system, the state of the hardware may be recorded during the process run, before the process run commences, and/or after the process run is completed. The same applies for recording readings from sensors in step S12, which means that readings from sensors are recorded during method time (as indicated in the chromatogram) and non-method time.

The system may include a data storage medium, e.g. database or files containing structured data. According to some aspects the method further comprises storing the recorded hardware state S11*a* and storing the readings from sensors S12*a* in the data storage medium, and the step of synchronizing hardware state S13 with readings from sensors further comprises accessing S13*a* the data storage medium.

According to some aspects, the hardware state and readings from sensors are recorded as a function of time and/or volume. In some processes the chromatogram is illustrated as a function of time, and in other processes the chromatogram is illustrated as a function of volume. In order to toggle between these two representations, readings may be recorded both as a function of time and a function of volume.

According to some aspects, the hardware state and readings from sensors are recorded as a function of scheduled events. The x-axis in the chromatogram does not necessarily have to be a time or volume, since the same functionality may be obtained using the order of the scheduled events as a marker to reconstruct the events during the process run.

According to some aspects, the hardware comprises control valves and the step of recording the hardware state S11 comprises recording control valve positions.

According to some aspects, the hardware state and readings from sensors are recorded when initializing the bioprocess purification system for the process run, i.e. before the process run starts. Events that will have an influence on the process run may include pump wash procedures, system initialization, etc.

According to some aspects, the hardware state and readings from sensors are recorded after the process run is completed, e.g. washing or resetting the system by calibration pumps etc.

The process run is controlled by a number of instructions executed consecutively and each instructions will cause an event. According to some aspects, the method further comprises an optional step S13*b* to synchronize hardware state and readings from sensors with the instructions to link the instructions with the hardware state. By including the instructions controlling the process it is possible to track the hardware state based on the instructions. It is therefore easier to identify errors emanating from errors in instructions, and to find suitable remedies to identified errors.

The pre-programmed method to perform the process run may be divided into process phases, such as: "Method settings", "Column CIP", Equilibration", "Sample Application" and "Elution", and each process phase comprises at least one instruction. According to some aspects, the method further comprises an optional step S13*c* to determine current process phase based on executed instructions. In addition, completed process phase(s) and future process phase(s) may also be determined.

When the pre-programmed method is executed, instructions are initiated consecutively and according to some aspects the method further comprises linking S13*d* each initiated instruction with an associated process phase.

The instructions may be manually controlled or implemented as instructions in a computer program. The instructions may be indicated directly in the chromatogram, or separately.

According to some aspects, non-allowed hardware combinations, e.g. a first valve should always be closed when a second valve is open, are listed and the method further comprises automatically identifying non-allowed hardware combinations S14 when reconstructing events related to the process run.

According to some aspects, a point related to elapsed time in the process run is selected in step S15 and for that point the hardware state and synchronized data is displayed. The point may be related to time, volume and/or events, and the displayed synchronized data comprises hardware state and synchronized readings from sensors. Synchronized instructions may also be included.

The flow ends in step S16, and the data stored in the data storage medium may be accessed to create the graphical interfaces illustrated in FIGS. 2-11.

The method may be implemented in a control system 40 for reconstructing events related to a process run in a bioprocess purification system 41, as described in connection with FIG. 14. The control system is configured to interact with hardware configured to control the events related to the purification of a liquid in the bioprocess purification system and is further configured to:

record hardware state related to the process run;

record readings from sensors related to the process run; and synchronize hardware state with readings from sensors to link the hardware state with the result from the process run.

According to some aspects, the control system is further configured to store the recorded hardware state and readings from sensors in a data storage medium 42; and the control system is further configured to access the data storage medium to synchronize the hardware state with readings from sensors.

According to some aspects, the hardware state and readings from sensors are recorded as a function of time and/or volume. According to some aspects, the hardware state and readings from sensors are recorded as a function of scheduled events.

According to some aspects the hardware comprises control valves and the control system is further configured to record the control valve positions when recording the hardware state.

According to some aspects, the hardware state and readings from sensors are recorded when initializing the bioprocess purification system for the process run.

According to some aspects, the hardware state and readings from sensors are recorded after the process run is completed.

According to some aspects, the control system is configured to select a point related to elapsed time in the process run and to display, for that point, the hardware state and synchronized data. The point may be related to time, volume and/or events, and the displayed synchronized data comprises hardware state and synchronized readings from sensors. Synchronized instructions may also be included.

According to some aspects, the events are controlled by a number of instructions executed consecutively in a program and the control system further is configured to synchronize hardware state and readings from sensors with the instructions to link the instructions with the hardware state.

According to some aspects, non-allowed hardware combinations are listed and the control system is further configured to automatically identify non-allowed hardware combinations when reconstructing events related to the process run.

FIG. 13 is a flowchart illustrating a process to simulate future events in a bioprocess purification system comprising hardware configured to control the events related to the purification of a liquid in the bioprocess purification system. Future events are controlled by a number of instructions executed consecutively, either manually or when implemented in a computer program. The wording "related to" means that not only events during method time is included in the simulation, but also other events related to the process run, e.g. actions performed during the process run when the chromatogram is not normally recording sensor values, washing performed after the process run is completed etc., are included.

The method starts in step S20 and comprises three main steps:

establishing a current state S21 of the process run;

assessing an outcome S23 of each non-executed instructions based on information stored in a data storage medium; and predicting future events S24 based on the current state of the process run and the assessed outcome of the non-executed instructions.

Future events related to non-executed instructions are accessible from a data storage medium, such as a database, in which historic data from previous runs or results from analytic calculations may be stored to determine an outcome when executing the instruction in view of preconfigured requirements and the current state of the process.

The step of establishing the current state S21 of the process run may be an initial state set by user preferences if the process run has not started. On the other hand if the process run has started and a number of instructions has been executed, it is necessary to obtain information of the state of the process run by retrieving information from sensors based on the executed instructions.

According to some aspects, the current state is established by:

recording hardware state S11 related to the process run when executing the instructions;

recording readings from sensors S12 related to the process run when executing the instructions; and synchronizing hardware state S22 with readings from sensors to establish the current state of the process run.

In the step of recording hardware state S11, e.g. valve positions in the bioprocess purification system, the state of the hardware may be recorded during the process run, before the process run commences, and/or after the process run is completed. The same applies for recording readings from sensors in step S12, which means that readings from sensors are recorded during method time (as indicated in the chromatogram) and non-method time.

According to some aspects, the step of synchronizing hardware state with readings from sensors S22, comprises synchronizing hardware state with executed instructions to determine (S22a) current process phase and/or linking (S22b) each initiated instructions to an associated process phase.

The system may include a data storage medium, e.g. database or files containing structured data. According to some aspects the method further comprises storing the recorded hardware state S11a and storing the readings from sensors S12a in the data storage medium, and the step of synchronizing hardware state S22 with readings from sensors further comprises accessing the data storage medium.

According to some aspects, the hardware state and readings from sensors are recorded as a function of time and/or volume. In some processes the chromatogram is illustrated as a function of time, and in other processes the chromatogram is illustrated as a function of volume. In order to toggle between these two representations, readings may be recorded both as a function of time and a function of volume.

According to some aspects, the hardware state and readings from sensors are recorded as a function of scheduled events. The x-axis in the chromatogram does not necessarily have to be a time or volume, since the same functionality may be obtained using the order of the scheduled events as a marker to reconstruct the events during the process run.

According to some aspects, the hardware comprises control valves and the step of recording the hardware state S11 comprises recording control valve positions.

According to some aspects, the hardware state and readings from sensors are recorded when initializing the bioprocess purification system for the process run, i.e. before the process run starts. Events that will have an influence on the process run may include pump wash procedures, system initialization, etc.

According to some aspects, the hardware state and readings from sensors are recorded after the process run is completed, e.g. washing or resetting the system by calibration pumps etc.

In order to toggle between time and volume representations when predicting future events in step S24, data to support the assessed outcome of the non-executed instructions may be stored in the data storage medium both as a function of time and a function of volume.

According to some aspects, the method further comprises selecting S25 a point related to future elapsed time in the process run and for that point displaying the predicted future events. The point may be related to time, volume and/or events, and the displayed predicted future events comprises assessed outcome of each non-executed instructions, i.e. hardware state and readings from sensors.

According to some aspects, the step of predicting future events is updated when a non-executed instruction has been executed and the process run has progressed. A more accurate prediction may be provided whenever a non-executed instruction is executed and readings from the sensors are measured.

The method ends in S26.

The method may be implemented in a control system 40 for simulating future events related to a process run in a bioprocess purification system 41. The control system is configured to interact with hardware configured to control the events related to the purification of a liquid in the bioprocess purification system, and the events are controlled by a number of instructions executed consecutively and is further configured to:

establish a current state of the process run;

access an outcome of each non-executed instructions based on information stored in a data storage medium; and predict future events based on the current state of the process run and the accessed outcome of the non-executed instructions.

According to some aspects, the control system is further configured to:

record hardware state related to the process run when executing the instructions;

record readings from sensors related to the process run when executing the instructions; and synchronize hardware state with readings from sensors in order to establish the current state of the process run.

According to some aspects, the control system is further configured to store the recorded hardware state and readings from sensors in a data storage medium; and the control system is further configured to access the data storage medium to synchronize the hardware state with readings from sensors.

According to some aspects, the hardware state and readings from sensors are recorded as a function of time and/or volume. According to some aspects, the hardware state and readings from sensors are recorded as a function of scheduled events.

According to some aspects, the hardware comprises control valves and the control system is further configured to record the valve positions when recording the hardware state.

According to some aspects, the hardware state and readings from sensors are recorded when initializing the bioprocess purification system for the process run and/or after the process run is completed.

According to some aspects, the control system is further configured to select a point related to future elapsed time in the process run and for that point to display the predicted future events. The point may be related to time, volume and/or events, and the displayed predicted future events comprises assessed outcome of each non-executed instructions, i.e. hardware state and readings from sensors.

According to some aspects, the control system further is configured to update the prediction of future events when a non-executed instruction has been executed and the process run has progressed.

FIG. 14 illustrates a control system 40 configured to interact with a bioprocess purification system 41. The control system has access to a data storage medium 42, such as a database or files containing structured data. It should be mentioned that the data storage medium may be integrated in the control system 40, as long as the control system has access to the data storage 42.

The control unit comprises a RAM (Random Access Memory) 43 in which a computer program with instructions may be stored and executed in a micro-processor 45. Information is presented on a display 44. Manual input may be provided via a mouse, keyboard, touch, stylus, voice control, eye tracking, gaze, gestures or any other suitable means, to manually insert instructions which are executed to cause events to take place.

The control unit 40 may be used to implement both the method for reconstructing events as outlined in FIG. 12 and simulating future events as outlined in FIG. 13. The information displayed may be a chromatogram synchronized with hardware state with or without instructions indicated.

A computer program for reconstructing events related to a process run in a bioprocess purification system may be stored in the RAM 43, comprising instructions which, when executed on at least one processor 45, cause the at least one processor to carry out the method described in connection with FIG. 12.

The computer program may be stored on a computer-readable storage medium carrying the computer program for reconstructing events related to a process run in a bioprocess purification system.

A computer program for simulating future events related to a process run in a bioprocess purification system may be stored in the RAM 43, comprising instructions which, when executed on at least one processor 45, cause the at least one processor to carry out the method described in connection with FIG. 13.

The computer program may be stored on a computer-readable storage medium carrying the computer program for simulating future events related to a process run in a bioprocess purification system.

The invention claimed is:

1. A method for reconstructing events during non-method time related to a previously performed process run in a bioprocess purification system comprising hardware configured to control the events during non-method time related to the purification of a liquid containing a sample in the bioprocess purification system, the events during non-method time being controlled by a number of instructions executed consecutively, the method comprising, during the process run:

recording hardware state related to the process run as a function of time and/or volume of the process run;

modifying the hardware state of the bioprocess purification system during a first section of the non-method time, wherein the modifying comprises changing a configuration of one or more valves and/or one or more pumps of the bioprocess purification system between a first portion of method time during the process run and a second portion of method time during the process run;

recording readings from UV and/or conductivity sensors related to the process run as a function of time and/or volume of the process run, wherein the UV and/or conductivity sensors are configured to record sensor data during the method time and not during the non-method time;

recording manual instructions executed during the process run as a function of time and/or volume of the process run;

synchronizing the hardware state with the readings from sensors to link the hardware state with the result from the process run; and synchronizing the hardware state and the readings from sensors with the manual instructions to link the instructions with the hardware state and after completion of the process run, (i) determining, based at least in part on the hardware state, a non-allowed hardware combination of the bioprocess purification system during the first section of the non-method time, (ii) wherein the hardware state and the readings from the sensors were synchronized with the manual instructions to link a particular instruction of the instructions to the non-allowed hardware combination, and (iii) displaying the hardware state, readings, and manual instructions executed during the process run as a function of time and/or volume of the previously performed process run, wherein the displaying occurs on a graphical user interface configured to show:

a control bar, comprising (i) a first section that corresponds to the first portion of method time, (ii) a second section that corresponds to the non-method time, and (iii) a third section that corresponds to the second portion of method time;

a cursor on the control bar, wherein the cursor can be placed at any point on the control bar by a user;

a chromatogram of the readings recorded from the UV and/or conductivity sensors related to the process run;

a first graphical element on the chromatogram corresponding to a location of the cursor and representing a UV or conductivity reading, wherein the first graphical element remains unchanged when the cursor is moved by the user between any two points within the non-method time;

a second graphical element representing the hardware state, wherein the second graphical element depicts a first hardware state when the cursor is moved to a first point in the non-method time and a second hardware state different from the first hardware state when the cursor is moved to a second point in the non-method time; and a third graphical element for identifying that the bioprocess purification system was in the non-allowed hardware combination during the first section of the non-method time and that non- allowed hardware combination emanated from the particular instruction.

2. The method according to claim 1, wherein the method further comprises storing the recorded hardware state and readings from sensors in a data storage medium; and the step of synchronizing hardware state with readings from sensors further comprises accessing the data storage medium.

3. The method according to claim 1, wherein the hardware state and readings from sensors are recorded as a function of scheduled events.

4. The method according to claim 1, wherein the method further comprises selecting a third point related to an elapsed time in the process run and for that third point displaying the hardware state and the synchronized readings from sensors.

5. The method according to claim 1, wherein the process run is divided into a number of process phases, each process phase comprising at least one instruction, the method further comprises determining current process phase.

6. The method according to claim 1, further comprising linking each initiated instruction with associated process phase.

7. A non-transitory computer-readable storage medium carrying a computer program for reconstructing events related to the process run in the bioprocess purification system according to claim 1.

8. The method of claim 1, wherein each instruction executed during the process run causes an event.

9. The method of claim 1, wherein determining, based at least in part on the hardware state, the non-allowed hardware combination of the bioprocess purification system during the first section of the non-method time comprises:

determining that a first valve of the one or more valves is in a first position;

based on the first valve being in the first position, determining an expected position for a second valve of the one or more valves; and determining that the second valve is not in the expected position.

10. A control system for reconstructing events during non-method time related to a previously performed process run in a bioprocess purification system, the events during non-method time being controlled by a number of instructions executed consecutively in a program, wherein the control system is configured to interact with hardware configured to control the events during non-method time related to the purification of a liquid containing a sample in the bioprocess purification system, wherein the control system is further configured to, during the process run:

record hardware state related to the process run as a function of time and/or volume of the process run;

modify the hardware state of the bioprocess purification system during the non-method time, wherein the modifying comprises changing a configuration of one or more valves and/or one or more pumps of the bioprocess purification system between a first portion of method time during the process run and a second portion of method time during the process run;

record readings from UV and/or conductivity sensors related to the process run as a function of time and/or volume of the process run, wherein the UV and/or conductivity sensors are configured to record sensor data during the method time and not during the non-method time;

record manual instructions executed during the process run as a function of time and/or volume of the process run;

synchronize the hardware state with the readings from sensors to link the hardware state with the result from the process run; and synchronize the hardware state and the readings from sensors with the manual instructions to link the instructions with the hardware state and, wherein the control system is further configured to, after completion of the process run, (i) determine, based at least in part on the hardware state, a non-allowed hardware combination of the bioprocess purification system during the first section of the non-method time, (ii) wherein the hardware state and the readings from the sensors were synchronized with the manual instructions to link a particular instruction of the instructions to the non-allowed hardware combination, and (iii) display the hardware state, readings, and manual instructions executed during the process run as a function of time and/or volume of the previously performed process run on a graphical user interface configured to show:

a control bar, comprising: (i) a first section that corresponds to the first portion of method time, (ii) a second section that corresponds to the non-method time, and (iii) a third section that corresponds to the second portion of method time;

a cursor on the control bar, wherein the cursor can be placed at any point on the control bar by a user;

a chromatogram of the readings recorded from the UV and/or conductivity sensors related to the process run;

a first graphical element on the chromatogram corresponding to a location of the cursor and representing a UV or conductivity reading, wherein the first graphical element remains unchanged when the cursor is moved by the user between any two points within the non-method time;

a second graphical element corresponding to the hardware state, wherein the second graphical element depicts a first hardware state when the cursor is moved to a first point in the non-method time and a second hardware state different from the first hardware state when the cursor is moved to a second point in the non-method time; and a third graphical element for identifying that the bioprocess purification system was in the non-allowed hardware combination during the first section of the non-method time and that non-allowed hardware combination emanated from the particular instruction.

11. The control system according to claim 10, wherein the control system is further configured to store the recorded hardware state and readings from sensors in a data storage medium; and the control system is further configured to access the data storage medium to synchronize the hardware state with readings from sensors.

12. The control system according to claim 10, wherein the hardware state and readings from sensors are recorded as a function of scheduled events.

13. The control system according to claim 10, wherein the control system further is configured to select a third point related to an elapsed time in the process run and for that third point to display the hardware state and the synchronized readings from sensors.

14. The control system according to claim 10, wherein the process run is divided into a number of process phases, each process phase comprising at least one instruction, the control system is further configured to determine current process phase.

15. The control system according to claim 10, the control system is further configured to link each initiated instructions to an associated process phase.

* * * * *

14